United States Patent [19]

Oda et al.

[11] 4,014,525
[45] Mar. 29, 1977

[54] HORIZONTAL TYPE CONTINUOUS PUG MILL FOR HIGH VISCOUS MATERIAL

[75] Inventors: Chikao Oda; Morihisa Maruko, both of Kudamatsu, Japan

[73] Assignee: Hitachi, Ltd., Japan

[22] Filed: Sept. 22, 1975

[21] Appl. No.: 615,680

[30] Foreign Application Priority Data

Sept. 25, 1974 Japan .......................... 49-109537

[52] U.S. Cl. .................................. 259/9; 259/182
[51] Int. Cl.² ...................... B01F 7/02; B01F 9/00; A21C 1/00; A23G 1/00
[58] Field of Search ................................ 259/8–10, 259/23–26, 43–46, 107–110, 182; 198/136, 209, 211–213; 241/185 A, 172

[56] References Cited

UNITED STATES PATENTS 3,041,051  6/1962  Reiffen ................................ 259/9

*Primary Examiner*—Harvey C. Hornsby
*Assistant Examiner*—Robert Pous
*Attorney, Agent, or Firm*—Craig & Antonelli

[57] ABSTRACT

A horizontal type continuous pug mill for a high viscous material in which means for feeding the material to be treated are provided in spaces defined by a mill body and adjacent agitating blades thereby minimizing rotation of the material together with the blades and promoting the surface refreshment of the material.

4 Claims, 5 Drawing Figures

HORIZONTAL TYPE CONTINUOUS PUG MILL FOR HIGH VISCOUS MATERIAL

BACKGROUND OF THE INVENTION

This invention relates to a horizontal type continuous pug mill for high viscous material and particularly to an improvement of the construction of a continuous polymerizing apparatus for making polycondensation reaction of a synthetic resin, such as polyester. The following description will be given by reference to a continuous polymerizing apparatus.

A conventional horizontal continuous polymerizing apparatus of multi-disk type is arranged such that a monomer material to be polymerized and which has a viscosity of several poises is supplied from an inlet nozzle at one end of the apparatus into a body thereof to polymerize it by pugging and then is discharged from an outlet nozzle at the other end of the apparatus. The pugging of the monomer is effected by rotation of agitating blades within the body under the condition of a vacuum of several Torr (1 Torr being 1 mmHg) and at a temperature of about 280° C. What is raised as a problem in such a case is that when the polymerization of the monomer to be treated progresses to rise its viscosity up to several hundreds poises, the material once stuck to an agitating blade or blades is rotated together therewith thereby causing a stagnation area or areas of the material on a surface or surfaces of the blade or blades. When the material to be treated is stuck on the surface of the blade, the surface refreshing effect of the material is lowered to increase its film thickness and obstract diffusion of the volatile substance, and therefore there are disadvantages that the reaction is required for a relatively long time and that the residence time of the material in the body becomes uneven to degrade the products.

SUMMARY OF THE INVENTION

An object of the present invention is to provide a horizontal type continuous pug mill, such as a polymerizing apparatus, wherein the disadvantages of the prior arts are removed and the surface refreshing effect of the material to be treated is high and the stagnation of the material in the body is minimized.

To achieve this object, the apparatus of the present invention is arranged such that each of its agitating blades is endowed with scraping function at its downstream side and with feeding function at its upstream side to force feeding of the material between the blades in cooperation therewith.

To force feeding of the material to be treated, it is preferable to provide a compressing plate and a scraping plate inclined to each of the agitating blades adjacent the upstream and downstream sides, respectively, of the blade. With this arrangement, the spaces between the blades and the compressing and scraping plates vary to furnish the material with feeding effect. Further, the agitating blades are rotated around the axis of the rotary shaft so that the length of the compressing and scraping plates may be sufficient to extend across the radial length of the agitating blades, namely from the lowermost portion of the body to the vicinity of the rotary shaft.

According to the present invention, there is provided a horizontal type pug mill for a high viscous material comprising a body having at its one end an inlet nozzle for entering the material therein and at the other end an outlet nozzle for discharging the material from the body, a rotary shaft extending through the body, a plurality of spaced agitating blades secured to the shaft and formed with through holes, and means for furnishing the material with feeding effect and which are provided in spaces, respectively, defined by the body and adjacent agitating blades.

DETAILED DESCRIPTION OF THE INVENTION

Figure 1:
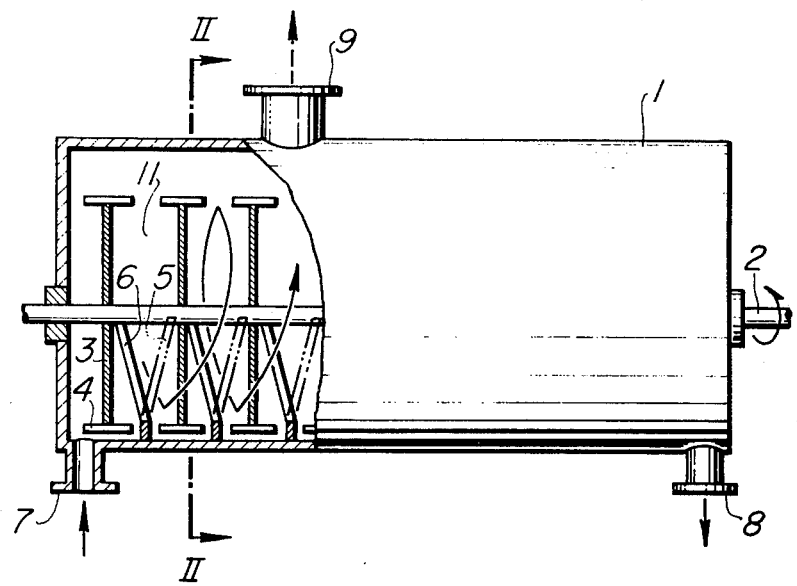
FIG. 1 is a longitudinal part-sectional view of an embodiment of a horizontal type continuous polymerizing apparatus according to the present invention.
Figure 2:
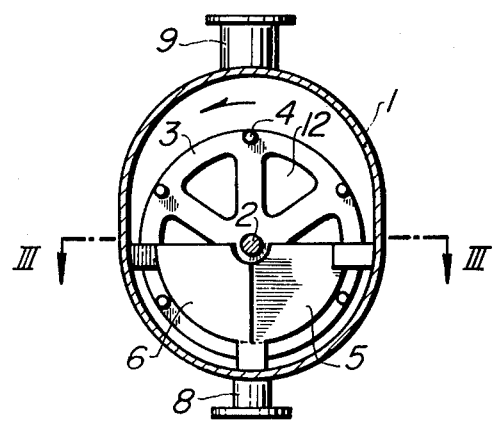
FIG. 2 is a section taken along a line II—II of FIG. 1.
Figure 3:
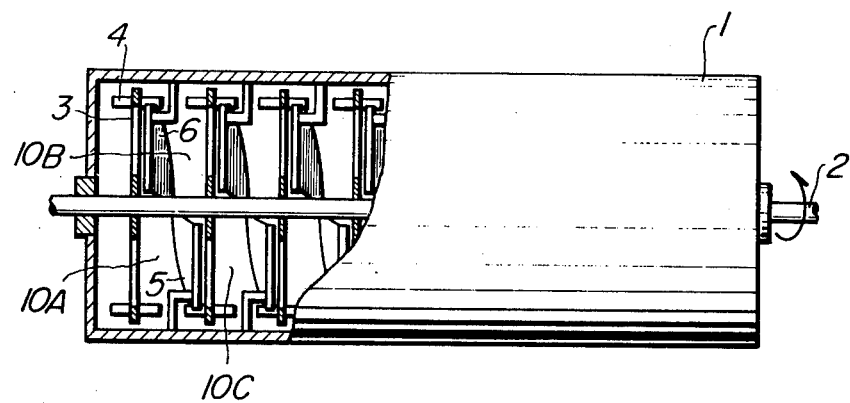
FIG. 3 is a part-sectional view taken along a line III—III of FIG. 2.

Referring to FIGS. 1 to 4, the polymerizing apparatus is provided with a hollow body 1 positioned so that its axis is orientated in a substantially horizontal direction. The body is provided with a monomer inlet nozzle 7 at its one end portion and a polymer outlet nozzle 8 at its other end portion, and a heating device, such as a jacket heater, (not shown) is mounted on the outer periphery of the body 1. Axially extending through the body 1 is a rotary shaft 2 which is connected to a suitable driving device (not shown) to rotate in a direction of the arrow shown. A plurality of spaced circular disk shaped agitating blades 3 is fixed to the shaft 2 to extend vertically in respect to the shaft 2 and each of the blades 3 is formed with through holes 12 and is provided with a plurality of projections 4 on its opposite sides adjacent the periphery of the blade, each of the projections 4 extending horizontally and having a length of about one half of each of spaces defined by the body 1 and the adjacent blades 3. The body 1 is also provided at its top portion with an outlet port 9 for discharging a volatile substance from the interior of the body to the exterior.

A plurality of quarter disk shaped compressing plates 5 and similarly shaped scraping plates 6 is secured to the lower portion of the body 1, and one pair of the compressing and scraping plates 5 and 6 extends into each of said spaces to the level of the shaft 2 in the body 1. Each of the compressing plates 5 is inclined towards the upstream side of an adjacent blade 3 and each of the scraping plates 6 is oppositely inclined towards the downstream side of an adjacent blade 3. In this embodiment, each of the pairs of the compressing and scraping plates 5 and 6 is integrally formed as clearly seen in FIG. 4. It should be noted that the compressing and scraping plates 5 and 6 are spaced away from the adjacent blades 3 and their projections 4 for causing smooth rotation thereof.

With this arrangement, the monomer to be treated is supplied from the inlet nozzle 7 into the body 1, and as the shaft 2 rotates the monomer flows through the holes 12 of the first blade 3 positioned nearest the inlet nozzle 7 and then into the space between the first and subsequent blades 3. In this space, the monomer is scraped by the scraping plate 5 from the downstream side of the first blade 3 and is agitated and pugged by the blades 3 and the projections 4 and then is urged or compressed towards the second blade 3 by the action of the compressing blade 6. During continuous rotation of the shaft 2, the monomer is forced to pass through the holes 12 and enter the second space defined by the second and third blades 3 and is subjected to the same treatment as in the first space. In this manner, the monomer passes through subsequent spaces to the outlet nozzle 8. During the passage of the lower polymer material, such as polyester, through the spaces, it is effectively agitated and pugged to promote its polymerization reaction to become a higher polymer material, and a volatile substance generated during this treatment in the body is discharged from the outlet port 9.

In other words, the material remaining in portions of liquid holding zones 10A is lifted up by the blades 3 to upper portions 11 of the spaces, the portions 11 being ordinarilly held in vacuum condition. The material stuck on the blades 3 and lifted up to the portions 11 is dropped by the action of gravity to refresh the surface of the material thereby promoting the polymerization reaction. The shaft 2 further rotates, the material is scraped by the scraping plates 6 to move to liquid holding zone 10B. In the zones 10B, the material is moved by the counterclockwise rotation (as viewed in FIG. 2) of the blades 3 from the left to the right as viewed in FIG. 3, namely from the sides of the scraping plates 6 to the sides of the compressing plates 5. When the material moves to the sides of the compressing plates 5, the material is compressed, since the gaps between the blades 3 and the compressing plates 5 are gradually narrowed towards their upper portions. Thus, the material is forced to pass through the holes 12 formed in the blades 3 and enter subsequent liquid holding zones 10C. At this time, the material stuck on the upstream sides of the blades 3 is scraped by the upper portions of the compressing plates 5. On the other hand, the material stuck on the inner surface of the body 1 is scraped and agitated by the projections 4.

With the arrangement decribed, the apparatus of the present invention functions such that by the cooperation of the compressing and scraping plates 5 and 6 and the blades 3 having the through holes 12 any dead space is not formed and effective surface refreshment of the material can be made and the continuous flow of liquid from the inlet end to the outlet end is like so-called a piston flow and so ideal polymerization reaction can be made.

Figure 5:
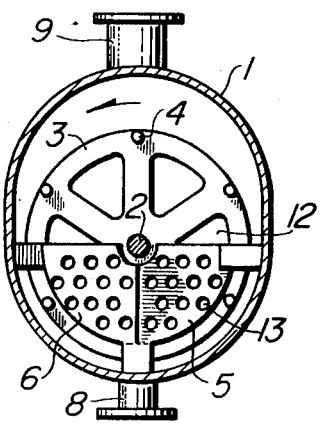
FIG. 5 is a cross section of another embodiment of the invention.
Figure 4:
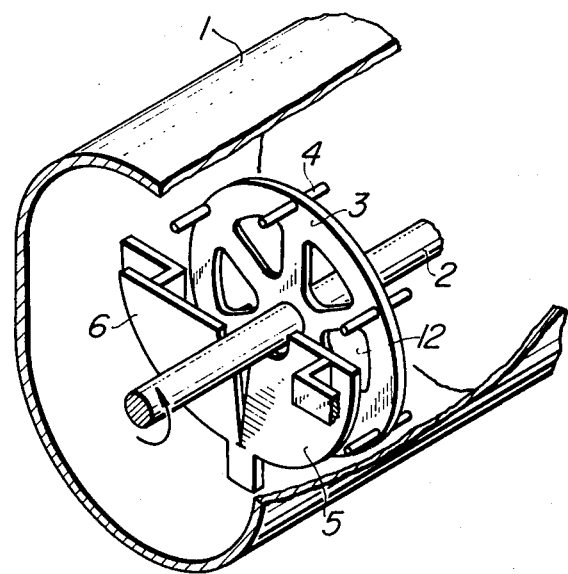
FIG. 4 is a perspective view partly broken away of the apparatus of FIG. 1.

The embodiment shown in FIG. 5 is characterized in that each of the compressing and scraping plates 5 and 6 is formed with a plurality of through holes 13 through which the material passes. By this arrangement, the feeding function of the compressing and scraping plates 5 and 6 is lowered so that the residence time of the material in the body 1 can be controlled.

With the arrangement described, the present invention brings forth the following effects.

1. The rotation of the material together with the blades is minimized to promote the surface refreshing effect of the material.

2. The film thickness of the material can be reduced to promote the diffusion of the volatile substance and make the residence time of the material constant thereby preventing degrading of the products.

Though the present invention has been explained by reference to the continuous polymerizing apparatus for polyester, the invention is not limited thereto and is applicable to various horizontal type pug mills for higher viscous materials in which there is a tendency for the materials to stick on the rotating members, and is also applicable to double shaft type mills.

What is claimed is:

1. A horizontal type continuous pug mill for a higher viscous material comprising a body provided at its one end with an inlet nozzle for the material to be treated and at its other end with an outlet nozzle, a rotary shaft extending through said body and driven to be rotated, a plurality of spaced agitating blades secured to said rotary shaft and formed with through holes and means provided in spaces defined by said body and adjacent agitating blades to endow the material with feeding function in cooperation with said agitating blades, said means comprising a plurality of compressing plates provided at the upstream sides of the agitating blades respectively, the upper end of each of said plates being inclined towards the adjacent agitating blade, a plurality of scraping plates provided at the downstream sides of the agitating blades respectively, and the upper end of each of said scraping plates being inclined towards the adjacent agitating blade whereby the compressing plates squeeze the viscous material through said through holes and the scraper plates scrape said squeezed viscous material from said agitating blades thus causing the viscous material to be advanced through said pug mill.

2. The pug mill as set forth in claim 1 wherein said compressing plates and said scraping plates are positioned from the lowermost portion of said body toward said rotary shaft.

3. The pug mill as set forth in claim 1 wherein each of said compressing plates and said scraping plates is made of a quarter shaped disk.

4. The pug mill as set forth in claim 1 wherein said compressing plates and said scraping plates are formed with through holes.

* * * * *